(12) United States Patent  
Westerman et al.

(10) Patent No.: US 9,075,483 B2
(45) Date of Patent: Jul. 7, 2015

(54) NEGATIVE PIXEL COMPENSATION

(75) Inventors: Wayne Carl Westerman, San Francisco, CA (US); Steve Porter Hotelling, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1025 days.

(21) Appl. No.: 11/963,578

(22) Filed: Dec. 21, 2007

(65) Prior Publication Data

US 2009/0160787 A1    Jun. 25, 2009

(51) Int. Cl.
*G06F 3/041* (2006.01)
*G06F 3/044* (2006.01)

(52) U.S. Cl.
CPC .............. *G06F 3/044* (2013.01); *G06F 3/0418* (2013.01)

(58) Field of Classification Search
CPC ... G06F 3/0418; G06F 3/044; G06F 3/04883; G06K 9/50; H03K 19/0016; H03K 19/00369
USPC ................... 345/156–184; 178/18.01–18.09, 178/19.01–19.04, 20.01
See application file for complete search history.

(56) References Cited

U.S. PATENT DOCUMENTS

| 5,483,261 | A |   | 1/1996  | Yasutake        |         |
|-----------|---|---|---------|-----------------|---------|
| 5,488,204 | A |   | 1/1996  | Mead et al.     |         |
| 5,751,276 | A | * | 5/1998  | Shih            | 345/178 |
| 5,825,352 | A |   | 10/1998 | Bisset et al.   |         |
| 5,835,079 | A |   | 11/1998 | Shieh           |         |
| 5,880,411 | A |   | 3/1999  | Gillespie et al.|         |
| 6,188,391 | B1|   | 2/2001  | Seely et al.    |         |
| 6,310,610 | B1|   | 10/2001 | Beaton et al.   |         |
| 6,323,846 | B1|   | 11/2001 | Westerman et al.|         |
| 6,690,387 | B2|   | 2/2004  | Zimmerman et al.|         |
| 7,015,894 | B2|   | 3/2006  | Morohoshi       |         |
| 7,184,064 | B2|   | 2/2007  | Zimmerman et al.|         |
| 7,663,607 | B2|   | 2/2010  | Hotelling et al.|         |

(Continued)

FOREIGN PATENT DOCUMENTS

JP    2000-163031 A    6/2000
JP    2002-342033 A    11/2002

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Kumar Patel
*Assistant Examiner* — Insa Sadio
(74) *Attorney, Agent, or Firm* — Morrison & Foerster LLP

(57) ABSTRACT

Compensation of pixels that generate erroneous readings (so-called "negative pixels"), produced when multiple touch events are generated by the same poorly grounded object on a touch sensor panel is disclosed. To minimize negative pixels, a thicker cover material and/or a lower dielectric constant can be used. Alternatively, narrower drive and sense lines can be employed. To compensate for negative pixels, a predicted negative pixel value can be computed as an indicator of pixels that are likely to be distorted. The negative pixel value for any particular pixel can be computing by summing up the touch output values for pixels in the drive line of that pixel, summing up the touch output values for pixels in the sense line of that pixel, and then multiplying these two sums. The predicted negative pixel value is added to the measured touch output value for the pixel to compensate for artificially negative readings.

27 Claims, 9 Drawing Sheets

(56) References Cited

U.S. PATENT DOCUMENTS

| | | |
|---|---|---|
| 8,479,122 B2 | 7/2013 | Hotelling et al. |
| 2003/0132922 A1* | 7/2003 | Philipp .................... 345/173 |
| 2006/0026521 A1 | 2/2006 | Hotelling et al. |
| 2006/0097991 A1* | 5/2006 | Hotelling et al. ............ 345/173 |
| 2006/0197753 A1 | 9/2006 | Hotelling |
| 2008/0158172 A1 | 7/2008 | Hotelling et al. |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," *CHI '92*, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner pixel 400

NEGATIVE PIXEL COMPENSATION

FIELD OF THE INVENTION

This relates to multi-touch sensor panels that utilize an array of capacitive sensors (pixels) to detect and localize touch events, and more particularly, to the compensation of pixels having distorted readings when two or more simultaneous touch events are generated by the same poorly grounded object.

BACKGROUND OF THE INVENTION

Many types of input devices are presently available for performing operations in a computing system, such as buttons or keys, mice, trackballs, touch sensor panels, joysticks, touch screens and the like. Touch screens, in particular, are becoming increasingly popular because of their ease and versatility of operation as well as their declining price. Touch screens can include a touch sensor panel, which can be a clear panel with a touch-sensitive surface, and a display device that can be positioned behind the panel so that the touch-sensitive surface can substantially cover the viewable area of the display device. Touch screens can allow a user to perform various functions by touching the touch sensor panel using a finger, stylus or other object at a location dictated by a user interface (UI) being displayed by the display device. In general, touch screens can recognize a touch event and the position of the touch event on the touch sensor panel, and the computing system can then interpret the touch event in accordance with the display appearing at the time of the touch event, and thereafter can perform one or more actions based on the touch event.

Touch sensor panels can be formed from a matrix of row and column traces, with sensors or pixels present where the rows and columns cross over each other while being separated by a dielectric material. Touch sensors can also be arranged in any number of dimensions and orientations, including diagonal, concentric circle, and three-dimensional and random orientations. In order to scan a touch sensor panel driven by multiple stimulation frequencies and compute an image of touch, various phases of selected low noise frequencies can be used to simultaneously stimulate the rows of the touch sensor panel, and multiple mixers can be configured to demodulate the signals received from the columns using the selected low noise frequencies. The demodulated signals from the multiple mixers, representing touch output values, can be used in calculations to determine an image of touch for the touch sensor panel at each frequency.

Touch sensor panels can be capable of detecting either single-touch events or multiple touch events, which are described in Applicant's co-pending U.S. application Ser. No. 11/649,998 entitled "Proximity and Multi-Touch Sensor Detection and Demodulation," filed on Jan. 3, 2007, the contents of which are incorporated by reference herein.

In multi-touch sensor panels, certain pixels can generate false, erroneous or otherwise distorted readings when two or more simultaneous touch events are generated by the same poorly grounded object.

SUMMARY OF THE INVENTION

This relates to the compensation of pixels that generate false, erroneous or otherwise distorted readings (so-called "negative pixels") that can be produced when two or more simultaneous touch events are generated by the same poorly grounded object on a touch sensor panel. Both mechanical and algorithmic means can be used to compensate for negative pixels.

In mechanical embodiments, a thicker cover material and/or a cover material with a lower dielectric constant can be used to minimize negative pixels. In either case, because the charge coupling through two fingers must pass through the cover material twice (once from the drive line up to one finger, and then from another finger back down to a sense line), passing through the dielectric twice is like two capacitors in series, which can reduce the capacitance and therefore the negative pixel effect. Additionally or alternatively, narrower drive and sense lines can be employed, so that there are fewer and smaller electric field lines and thus less charge coupling.

In compensation embodiments, a predicted negative pixel value can be computed as an indicator of pixels that are likely to be distorted. The predicted negative pixel value for any particular pixel can be computing by summing up the touch output values for pixels in the drive line of the particular pixel being considered, summing up the touch output values for pixels in the sense line of the particular pixel being considered, and then multiplying these two sums. A scaled function of the predicted negative pixel value can then be added to the measured touch output value for the pixel to compensate for artificially negative readings.

BRIEF DESCRIPTION OF THE DRAWINGS

FIG. 3d illustrates an exemplary image map showing a three-dimensional view of the phenomenon of negative pixels corresponding to the example of FIG. 3a.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

This relates to the compensation of pixels that generate false, erroneous or otherwise distorted readings when two or more simultaneous touch events are generated by the same poorly grounded object on a touch sensor panel. For purposes of this disclosure, "poorly grounded" may be used interchangeably with "ungrounded" or "floating" and includes poor grounding conditions that exist when the object (e.g. the user) is not making a low resistance electrical connection to the ground of the device employing the touch sensor panel. To compensate for these distorted readings, which can appear more negative than they should, a predicted negative pixel value can be computed as an indicator of pixels that are likely to be distorted. The predicted negative pixel value for any particular pixel can be computing by summing up the touch output values for pixels in the drive line of the particular pixel being considered, summing up the touch output values for pixels in the sense line of the particular pixel being considered, and then multiplying these two sums. A scaled function of the predicted negative pixel value can then be added to the measured touch output value for the pixel to compensate for artificially negative readings.

Figure 1A:
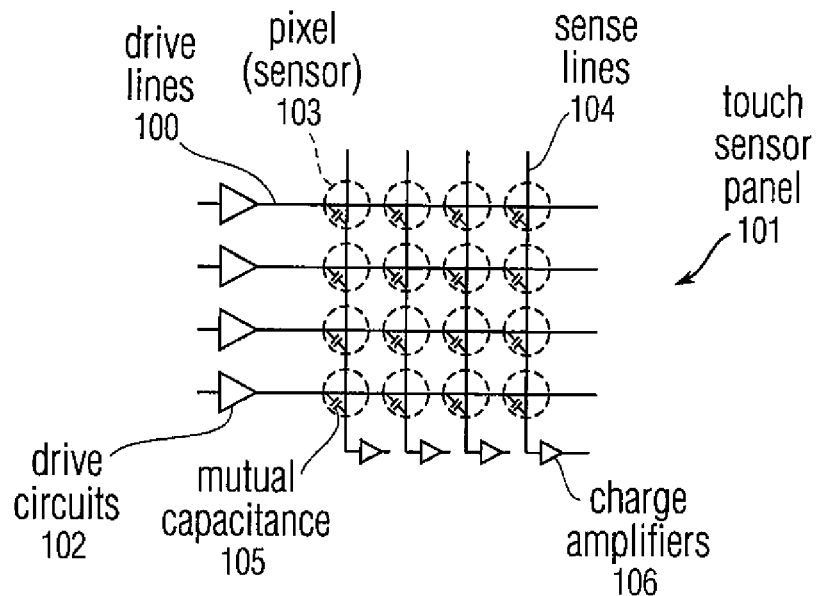
FIG. 1a illustrates an exemplary touch sensor panel having an array of sensors (pixels) formed from a plurality of drive lines and a plurality of sense lines.

FIG. 1a illustrates an exemplary touch sensor panel 101 having an array of sensors 103 that can be formed from a plurality of drive lines 100 and a plurality of sense lines 104. Drive lines (e.g. rows) 100 can be driven by stimulation signals from drive circuits 102. Because a mutual capacitance 105 can be formed between drive lines 100 and sense lines 104 (e.g. columns) at their crossing points (separated from each other by a dielectric), charge from the drive lines can be coupled onto the sense lines, where charge amplifiers 106 detect the charge and generate touch output values indicative of the amount of touch detected at a particular pixel. In general, the larger the touch output value, the more touch was detected.

Figure 1B:
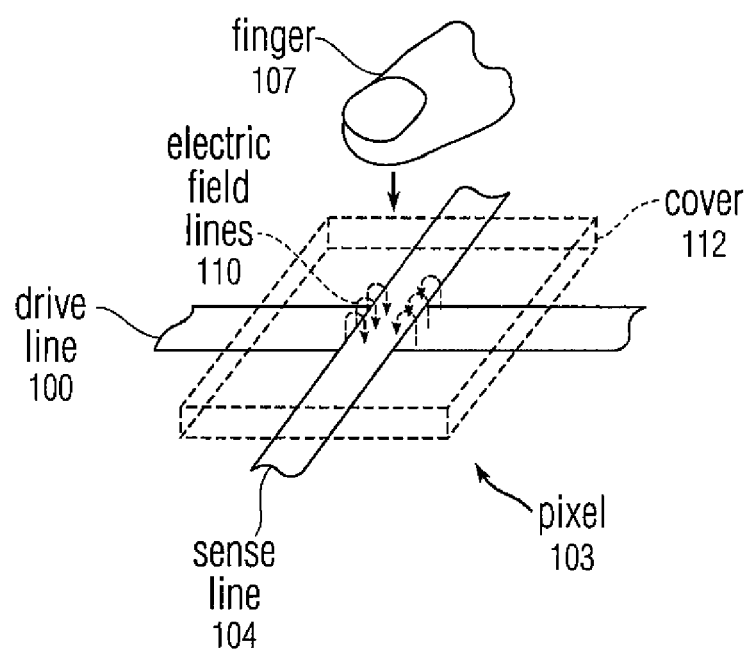
FIG. 1b illustrates a close-up of a single exemplary pixel formed from a drive line and a sense line and a finger touching down over the pixel.

FIG. 1b illustrates a close-up of a single exemplary sensor (a.k.a. electrode or pixel) 103 formed from drive line 100 and sense line 104 and finger 107 touching down over pixel 103. Fringing electric field lines can be formed between drive line 100 and sense line 104. Some electric field lines 110 can extend above cover 112, which is located above the sensor array. When finger 107 or other object touches down over pixel 103, the finger blocks some of the electric field lines 110 extending above cover 112, and thus affects the charge coupled onto sense line 104.

Figure 2A:
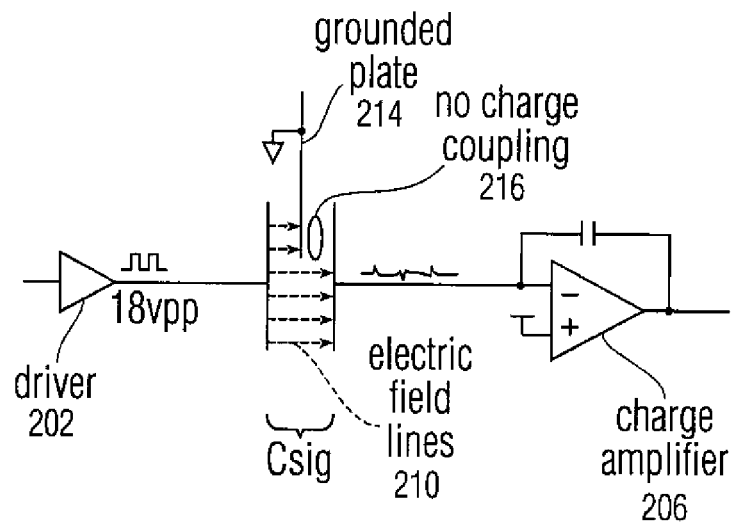
FIG. 2a illustrates an exemplary conceptually equivalent electrical circuit corresponding to FIG. 1b in which the finger is grounded to a device that includes the touch sensor panel.

FIG. 2a illustrates an exemplary conceptually equivalent electrical circuit corresponding to FIG. 1b in which the finger is grounded by touching a bezel, backside, etc. of a device that includes the touch sensor panel. In FIG. 2a, driver 202 can apply a stimulation signal (e.g. an 18 Vpp signal) across mutual capacitance Csig formed by the pixel, and charge amplifier 206 can detect the charge coupled across Csig. In FIG. 2a, because the finger is grounded, the finger can be represented conceptually as grounded plate 214 being inserted between the parallel plates of Csig, with the left plate representing the drive line and the right plate representing the sense line. Grounded plate 214 can block some of the electric field lines 210 flowing from the left plate to the right plate. Because blocked electric field lines 210 can be shunted to ground through the grounded finger, virtually no charge is coupled through to the sense column (see 216) for the blocked electric field lines 210.

Figure 2B:
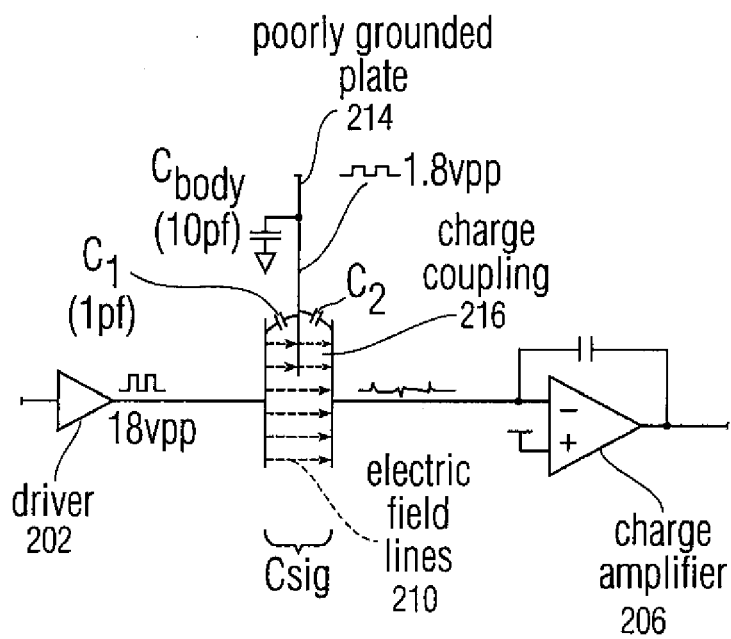
FIG. 2b illustrates an exemplary conceptually equivalent electrical circuit corresponding to FIG. 1b in which the finger is floating or otherwise not grounded to the device that includes the touch sensor panel.

FIG. 2b illustrates an exemplary conceptually equivalent electrical circuit corresponding to FIG. 1b in which the finger is floating, isolated or otherwise not grounded (i.e. substantially ungrounded) to the bezel, backside, etc. of the device that includes the touch sensor panel (as might occur if the user touched the touch sensor panel surface without picking up the device). In this situation, the finger can be capacitively coupled to the device through a capacitance Cbody of about 10-100 pF, which is a function of the area of the person and the area of the device. Furthermore, if the device is connected to a docking station, for example, this also increases the effective area of the device and therefore changes the capacitance. In FIG. 2b, driver 202 can apply a stimulation signal (e.g. an 18 Vpp signal) across mutual capacitance Csig formed by the pixel, and charge amplifier 206 can detect the charge coupled across Csig. In FIG. 2b, because the finger is isolated, the finger can be represented conceptually as a plate 214 being inserted between the parallel plates of Csig, with the left plate of Csig representing the drive line and the right plate representing the sense line. Because the finger is isolated, the plate has a capacitance Cbody to ground of about 10-100 pF. The capacitively coupled plate 214 forms a capacitance C1 with respect to the sense line and blocks some of the field lines 210, but instead of shunting the charge to ground, a capacitance C2 to the sense line is also formed. Thus, there is some charge coupling onto the sense line (see 216), and there is a small voltage signal coupled onto the finger. For example, if the stimulation signal is 18 Vpp and Cbody is 10 pF, about 1.8 Vpp can appear on the finger. The result of this charge coupling through the finger and onto the sense line is that the effect of a finger touch is reduced. The finger attenuates the amount of charge coupled onto the sense line, but some charge is still coupled through.

Figure 3A:
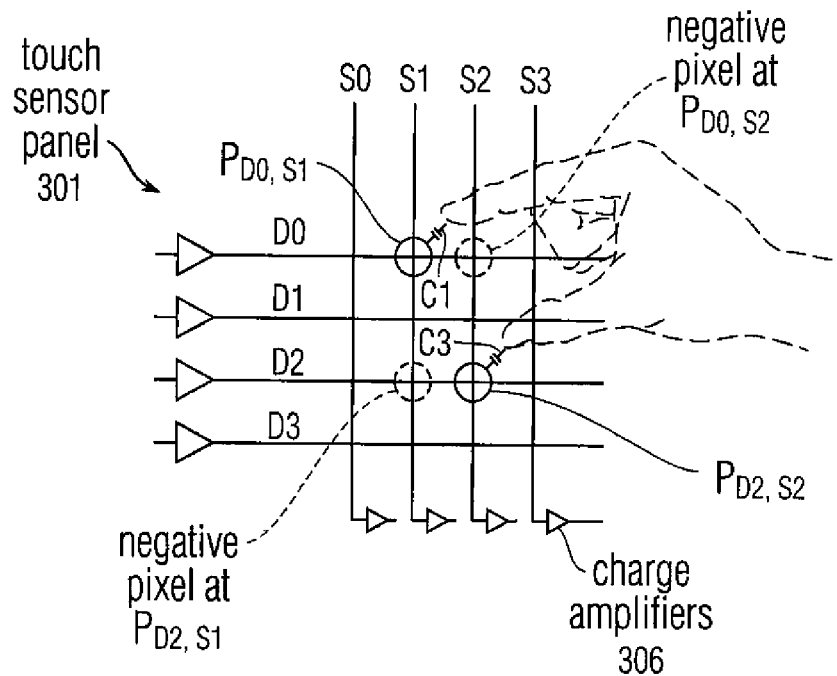
FIG. 3a illustrates an exemplary touch sensor panel experiencing two simultaneous touch events that produce a so-called "negative pixel" effect.

FIG. 3a illustrates an exemplary touch sensor panel 301 such as that shown in FIG. 1a, with drives lines identified as D0-D3 and sense lines identified as S0-S3. In the example of FIG. 3a, two fingers have touched down over two different spots on the sensor panel, at the pixel intersected by D0 and S1 ($P_{D0,S1}$) and at the pixel intersected by D2 and S2 ($P_{D2,S2}$).

In one example, if the fingers are grounded as described above, most or all of electric field lines that exit the cover above both pixels are blocked, little or no charge is coupled through to the sense lines S1 and S2, and therefore there is little or no error in the measured touch output value S of the pixels. In other words, charge amplifiers 306 connected to each of the sense lines S0-S2 are able to fully detect to touch events. Furthermore, little or no error is introduced into the measured touch output value S of other adjacent pixels.

However, in another example, where the fingers are isolated and D0 is being stimulated, charge from $P_{D0,S1}$ is coupled onto the finger touching down over $P_{D0,S1}$, but rather than being shunted to ground an attenuated waveform appears on the finger. The attenuated signal (and therefore some charge) is coupled back onto sense line S1, and is also coupled through the user's other finger onto sense line S2. If the user was grounded, because D2 is not being stimulated, the finger over $P_{D2,S2}$ would not cause any charge to be coupled onto S2. However, because the user is isolated in the present example, some signal and charge is in fact coupled onto S2. In other words, there is a capacitance C1 from the stimulated drive line D0 to one finger, and another capacitance C2 from another finger to sense line S2, causing charge to be coupled onto S2. The net effect is to increase the charge coupling onto S2 as compared to the case when the user is grounded.

In FIG. 3a, the effect of charge coupling back onto S1 and S2 will reduce the apparent touch detected at touch locations $P_{D0,S1}$ and $P_{D2,S2}$, based on the measured touch output values at those locations. In addition, this effect will increase the charge coupling and reduce the output indicative of a touch for pixels outside the touch locations, such as pixel $P_{D0,S2}$. For example, in a normal no-touch condition pixel $P_{D0,S2}$ may see 1.5 pF of mutual capacitance and a charge coupling Qsig of 27 pCpp, and in a grounded finger touch condition that same pixel may see 1.3 pF of mutual capacitance and a charge coupling of 24 pCpp. However, with charge coupling occurring across ungrounded fingers as described above, the effect on adjacent untouched pixel $P_{D0,S2}$ can be to increase the charge coupling above the normal no-touch condition of 27 pCpp, to 29 pCpp, for example. This amount of charge coupling, when detected by charge amplifier 306, gives the appearance of a so-called "negative pixel" or a negative amount of touch at $P_{D0,S2}$. Pixel $P_{D2,S1}$ can also experience the same negative pixel effect. Note that a negative pixel, as used herein, can include pixels that appear to have a negative amount of touch based on their touch output value, and pixels that have a positive but artificially reduced amount of touch based on their touch output value.

Figure 3B:
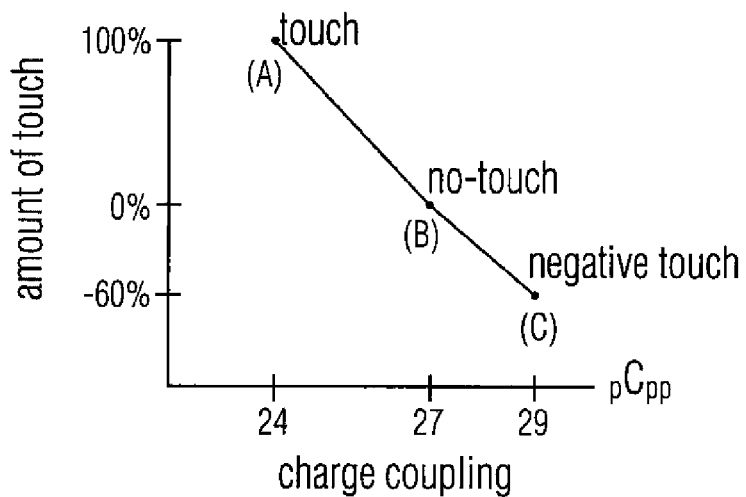
FIG. 3b is an exemplary plot of charge coupling versus detected touch output, illustrating the concept of a negative pixel.

FIG. 3b is an exemplary plot of charge coupling versus detected touch output, illustrating the concept of a negative pixel. FIG. 3b is a plot of charge (in pCpp) versus % touch for the current example. In FIG. 3b, a fill touch condition (100% touch) produces 24 pCpp at point (A), while a no touch condition (0% touch) produces 27 pCpp at point (B). However, at $P_{D0,S2}$, for example, a charge of 29 pCpp is present at point (C), which appears to be a −60% touch condition (a negative pixel).

Thus, the effect of charge coupling across ungrounded fingers to other sense lines can weaken not only the pixels being touched, but can also weaken adjacent pixels not being touched and located in the drive line being stimulated, to the point where they produce output readings indicative of a negative touch. Also, this problem is made worse if there are multiple pixels being touched along the drive line being stimulated, because now even more charge can be coupled onto other sense lines being simultaneously touched.

Figure 3C:
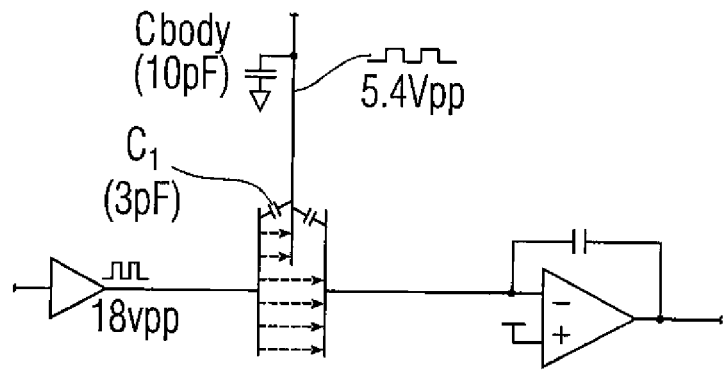
FIG. 3c illustrates an exemplary conceptual equivalent circuit showing the effect of three ungrounded fingers from the same hand touching the same drive line on the touch sensor panel of FIG. 3a while another finger touches a pixel on an unstimulated line.

FIG. 3c illustrates an exemplary conceptual equivalent circuit showing the effect of three ungrounded fingers from the same hand touching drive line D0 on the touch sensor panel of FIG. 3a while another finger touches pixel $P_{D2,S2}$. If D0 is stimulated (e.g. 18 Vpp), then more capacitance (e.g. 3 pF) can appear between the drive line and the fingers. Assuming that Cbody remains at 10 pF, more signal (e.g. 5.4 Vpp) can be coupled onto the fingers, and more charge can be coupled onto sense line S2, resulting in negative or at least lowered pixel values.

Figure 3D:
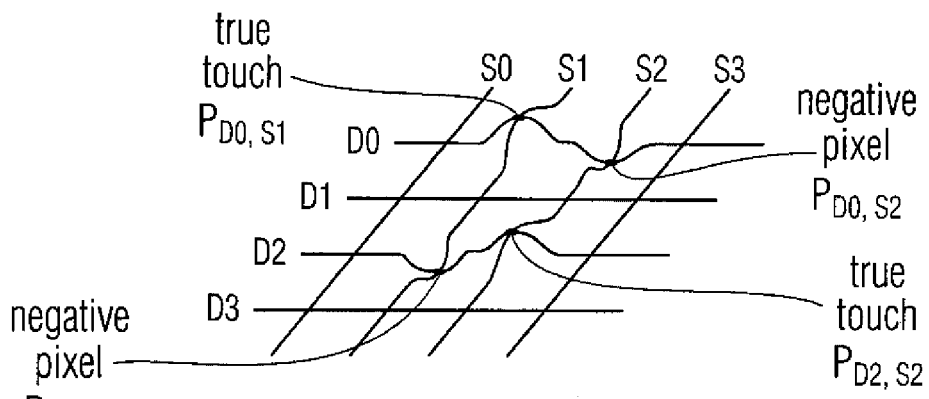

FIG. 3d illustrates an exemplary image map showing a three-dimensional view of the phenomenon of negative pixels corresponding to the example of FIG. 3a. Note the presence of positive output values at the locations of true touch ($P_{D0,S1}$ and $P_{D2,S2}$), and also the presence of negative pixels at locations $P_{D0,S2}$ and $P_{D2,S1}$.

Figure 3E:
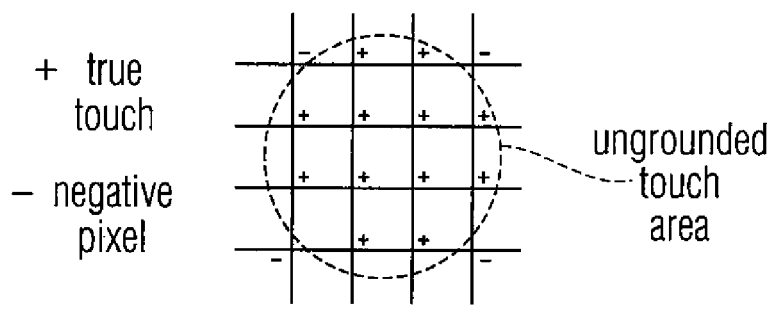
FIG. 3e illustrates an exemplary touch sensor panel with a single ungrounded touch creating negative pixels.

FIG. 3e illustrates an exemplary touch sensor panel with a single ungrounded touch (e.g. caused by a palm) creating negative pixels.

Embodiments of the invention provide several mechanisms for compensating for negative pixels. In one embodiment of the invention, a thicker cover material and/or a cover material with a lower dielectric constant can be used to minimize negative pixels. In either case, because the charge coupling through two fingers must pass through the cover material twice (once from the drive line up to one finger, and then from another finger back down to a sense line), passing through the dielectric twice is like two capacitors in series, which can reduce the capacitance and therefore the negative pixel effect. Referring to FIG. 3a, if C1 and C2 are small relative to Cbody, the negative pixel effect can be minimized, but if C1 and C2 are large relative to Cbody, the effect can be more pronounced. C1 and C2 scale with the thickness of the cover dielectric.

In another embodiment of the invention, narrower drive and sense lines can be employed, so that there are fewer and smaller electric field lines and thus less charge coupling.

Figure 4:
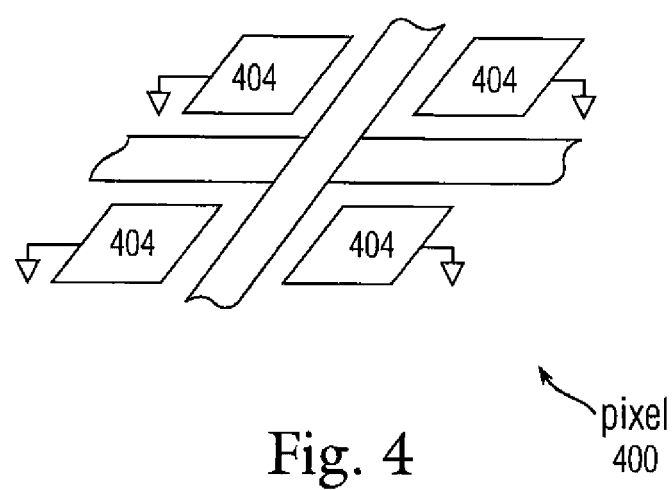
FIG. 4 illustrates an exemplary pixel including interlaced ground pads for reducing the negative pixel effect according to one embodiment of this invention.

FIG. 4 illustrates an exemplary pixel 400 including interlaced ground pads 404 adjacent to the pixel for reducing the negative pixel effect according to embodiments of the invention. In the embodiment of FIG. 4, Cbody (the capacitance from finger to ground) can be increased by providing more interlaced grounds 404 in the touch sensor panel. Cbody can increase as the finger gets closer to grounds 404.

The preceding embodiments can reduce the negative pixel effect so that it is not very noticeable for two fingers (but may still be noticeable for palms or other large objects, such as two coins touching each other, where coupling across rows is present).

Figure 5A:
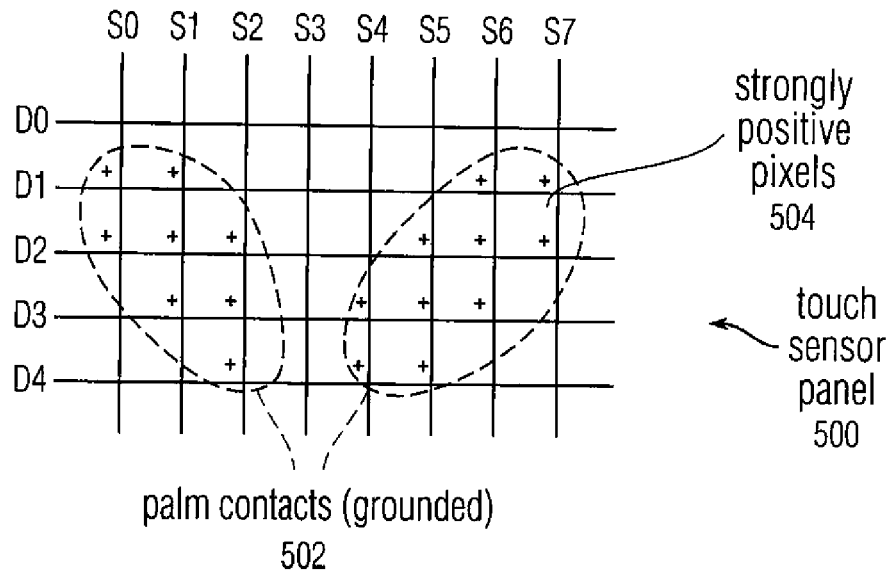
FIG. 5a illustrates an exemplary touch sensor panel with the palms of a grounded user touching the panel.

FIG. 5a illustrates an exemplary touch sensor panel 500 with palms 502 of a grounded user touching the panel. In this instance, the pixels 504 being touched can appear strongly positive (large output indicative of touch), and because the palms are grounded, little or no charge can be coupled onto other sense lines, and the negative pixel effect can be insignificant.

Figure 5B:
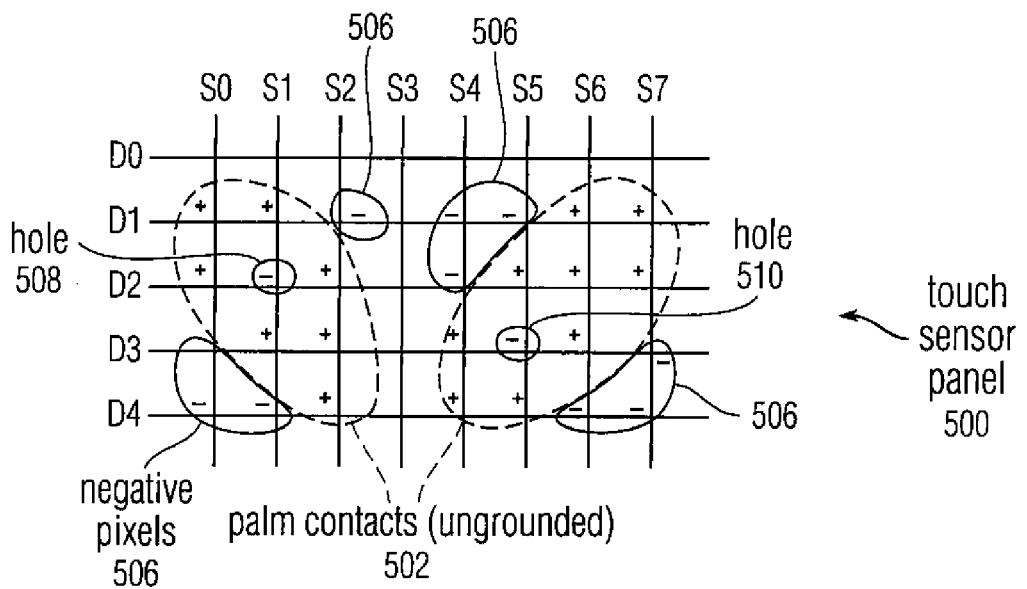
FIG. 5b illustrates an exemplary touch sensor panel with the palms of an ungrounded user touching the panel.

FIG. 5b illustrates an exemplary touch sensor panel 500 with palms 502 of an ungrounded user touching the panel. In this instance, in addition to strongly negative or at least weakened pixels 506 in the corner areas just outside the touch regions, negative or weakened pixels 508 and 510 (holes) can form within the palm areas 502, where a relatively large number of drive lines and sense lines are being simultaneously touched. In the example of FIG. 5b, hole 508 can be formed because of the relatively large number of simultaneous touch events occurring on drive line D3 and sense line S2, while hole 510 can be formed because of the relatively large number of simultaneous touch events occurring on drive line D3 and sense line S6.

According to embodiments of the invention, to compensate for the negative pixels and holes (or weakened areas) in FIG. 5b, those pixels most likely to experience the negative pixel effect can be determined by computing a predicted negative pixel value $N_{i,j}$ for each pixel i,j in the panel, as shown in exemplary Equation 1:

$$N_{ij} \alpha - \left(\sum_k f_2 S_{kj}\right) \times \left(\sum_l f_2 S_{il}\right) \div (P \times Q) \qquad (1)$$

where P is the total number of sense lines in the touch sensor panel, Q is the total number of drive lines in the touch sensor panel, S is the measured touch output value at a particular pixel k,j or i,l, the summations are over all pixels in row i and all pixels in row j, respectively, and $f_2 S$ is a function of S. This computation can be performed by firmware stored in memory and executed by the panel processor or the host processor.

In other words, for any particular pixel being considered, the first summation sums up the touch output values for pixels in the drive line of the particular pixel being considered, while the second summation sums up the touch output values for pixels in the sense line of the particular pixel being considered. Note that the summations in Eq. (1) can be divided by the product of the number of drive lines and sense lines to normalize the predicted negative pixel value $N_{i,j}$. The highest predicted negative pixel values can appear at those particular pixels where the measured touch output values for all pixels in the drive and sense lines intersecting that particular pixel are the greatest.

Figure 6A:
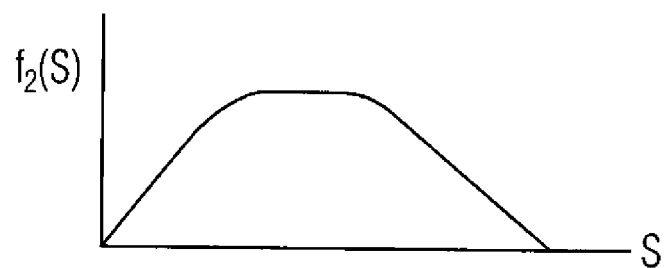
FIG. 6a illustrates an exemplary function $f_2S$ which is linear for low touch output values and then levels off and eventually drops to zero (no compensation) for strongly positive pixels according to one embodiment of this invention.

FIG. 6a illustrates an exemplary function $f_2 S$, which is linear for low touch output values and then levels off and eventually drops to zero (no compensation) for strongly positive pixels. The rationale for reducing $f_2 S$ to zero for strongly positive pixels is that those pixels typically exist only when the user is grounded, and thus little or no compensation may be necessary.

In other embodiments, Eq. (1) can be modified to sum only those pixels in the drive and sense lines of the particular pixel being considered having a positive touch output value, or sum only those pixels above a certain threshold.

After the predicted negative pixel values $N_{i,j}$ are computed for each pixel in the touch sensor panel, the touch output values themselves (S) can be compensated to compute S' using either exemplary Eq. (2) or Eq. (3):

$$S'_{i,j} = S_{i,j} + \alpha f_1 N_{i,j} \qquad (2)$$

$$S'_{i,j} = S_{i,j} \text{ if } S_{i,j} < kpos$$

$$S_{i,j} + \alpha f_1 N_{i,j} \text{ if } S_{i,j} \geq kPos \qquad (3)$$

In Eq. (2), the original pixel touch output values $S_{i,j}$ can be compensated by adding in a function $f_1$ of the predicted negative pixel value $N_{i,j}$, scaled using a gain factor $\alpha$. However, Eq. (2) can result in some pixels being made excessively positive, or the improper growing of patches. Therefore, Eq. (3) can be an alternative to Eq. (2). In Eq. (3), the original pixel touch output values $S_{i,j}$ are left unchanged if $S_{i,j}$ is below some threshold kPos, while the same formula found in Eq. (2) is applied if $S_{i,j}$ is equal to or above the threshold kpos. In one embodiment, kPos can be zero, such that no compensation may be applied when a pixel is negative, but compensation is applied when a pixel is positive. These computations can be performed by firmware stored in memory and executed by the panel processor or the host processor.

Note that this compensation can be applied, or at least evaluated, for all pixels in the touch sensor panel, whether or not the palm, finger or other object is grounded or not. The gain factor $\alpha$ can be set to be small (e.g. 0.1) to limit excessive results if the palm is in fact grounded. One way to determine if the palms are grounded is to compute the ratio of pixels with positive touch output values to pixels having negative touch output values. The smaller the value, the more negative pixels exist, which is likely to mean an ungrounded palm. In some embodiments, negative pixel compensation can be employed only after determining that the user is likely ungrounded. The ratio can also be used to compute the gain term a using any suitable formula.

Figure 6B:
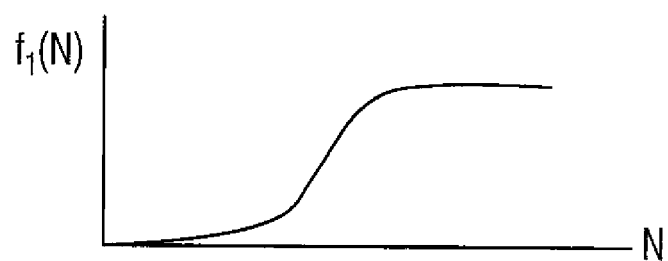
FIG. 6b is a plot of an exemplary function $f_1N$ for scaling the predicted negative pixel value according to embodiments of the invention.

FIG. 6b is a plot of an exemplary function $f_1 N$ for scaling the predicted negative pixel value according to embodiments of the invention. FIG. 6b and Eqs. (2) and (3) show that as the predicted negative pixel value grows, the amount of compensation for the original pixel touch output value rises, but eventually as the predicted negative pixel value grows large, the amount of compensation levels off. This can be done to prevent overcompensation when the finger or palm is grounded. Referring back to FIG. 5b, for strongly negative pixels 506, compensation is desired, but not so much so that the pixels go positive, which will cause the patch to grow improperly.

Figure 7:
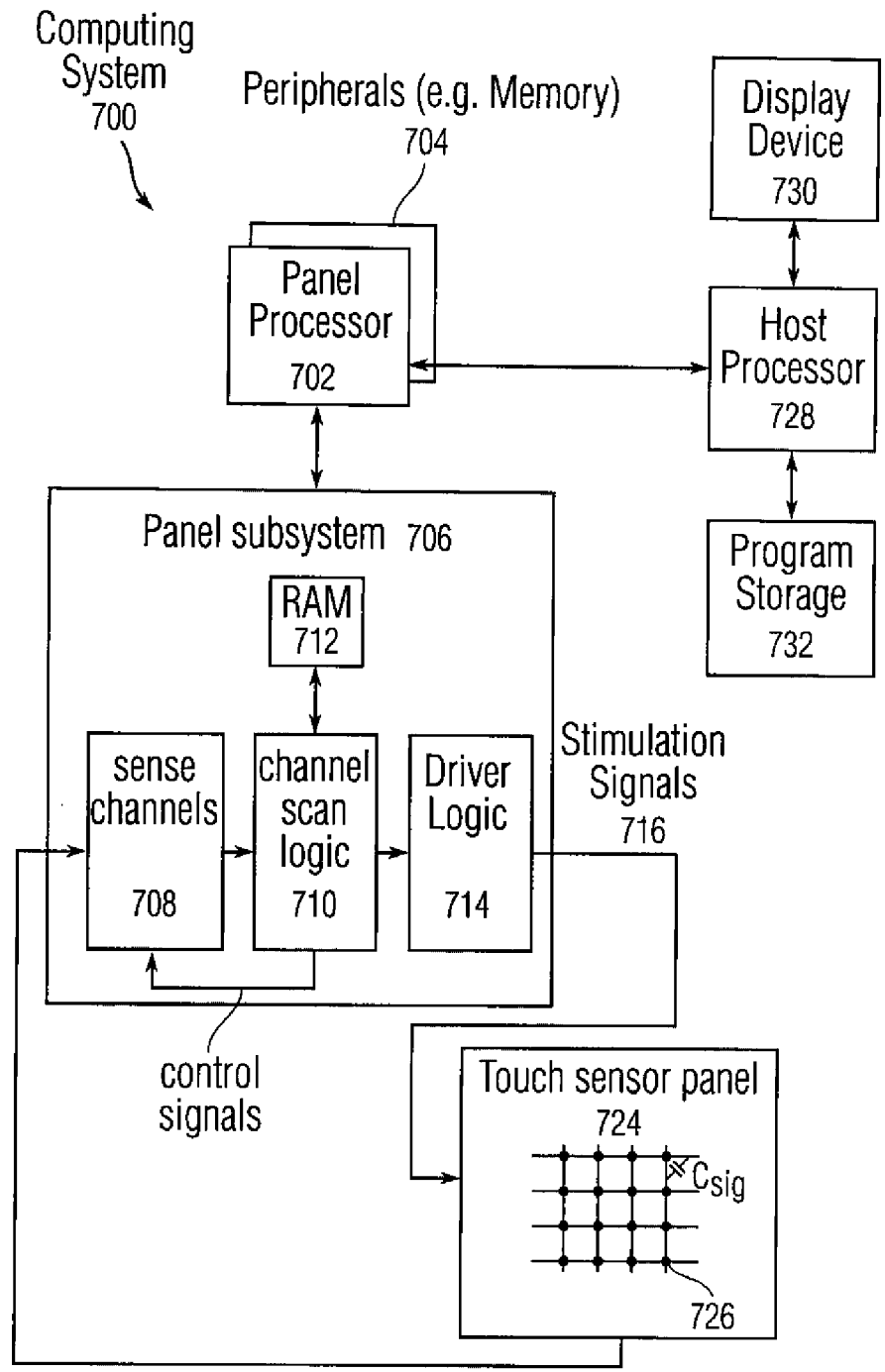
FIG. 7 illustrates an exemplary computing system that can perform negative pixel compensation according to one embodiment of this invention.

FIG. 7 illustrates exemplary computing system 700 that can perform negative pixel compensation as described above according to embodiments of the invention. Computing system 700 can include one or more panel processors 702 and peripherals 704, and panel subsystem 706. Peripherals 704 can include, but are not limited to, random access memory (RAM) or other types of memory or storage, watchdog timers and the like. Panel subsystem 706 can include, but is not limited to, one or more sense channels 708, channel scan logic 710 and driver logic 714. Channel scan logic 710 can access RAM 712, autonomously read data from the sense channels and provide control for the sense channels. In addition, channel scan logic 710 can control driver logic 714 to generate stimulation signals 716 at various frequencies and phases that can be selectively applied to rows of touch sensor panel 724. In some embodiments, panel subsystem 706, panel processor 702 and peripherals 704 can be integrated into a single application specific integrated circuit (ASIC).

Touch sensor panel 724 can include a capacitive sensing medium having a plurality of row traces or driving lines and a plurality of column traces or sensing lines, although other sensing media can also be used. Each intersection of drive and sense lines can represent a capacitive sensing node and can be viewed as picture element (pixel) 726, which can be particularly useful when touch sensor panel 724 is viewed as capturing an "image" of touch. (In other words, after panel subsystem 706 has determined whether a touch event has been detected at each touch sensor in the touch sensor panel, the pattern of touch sensors in the multi-touch panel at which a touch event occurred can be viewed as an "image" of touch (e.g. a pattern of fingers touching the panel).) Each sense line of touch sensor panel 724 can drive sense channel 708 (also referred to herein as an event detection and demodulation circuit) in panel subsystem 706.

Computing system 700 can also include host processor 728 for receiving outputs from panel processor 702 and performing actions based on the outputs that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 728 can also perform additional functions that may not be related to panel processing, and can be coupled to program storage 732 and display device 730 such as an LCD display for providing a UI to a user of the device.

Note that the computations on the raw measured pixel output values described above for performing negative pixel compensation can be performed by firmware stored in memory (e.g. one of the peripherals 704 in FIG. 7) and executed by panel processor 702, or stored in program storage 732 and executed by host processor 728. The firmware can also be stored and transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain, store, communicate, propagate, or transport the program for use by or in connection with the instruction execution system, apparatus, or device. The computer readable medium can include, but is not limited to, an electronic, magnetic, optical, electromagnetic, infrared, or semiconductor system, apparatus, device, or propagation medium. A computer-readable medium can include, but is not limited to, an electrical connection (electronic) having one or more wires, a portable computer diskette (magnetic), a random access memory (RAM) (magnetic), a read-only memory (ROM) (magnetic), an erasable programmable read-only memory (EPROM) (magnetic), an optical fiber (optical), portable optical disc such a CD, CD-R, CD-RW, DVD, DVD-R, or DVD-RW, or flash memory such as compact flash cards, secured digital cards, USB memory devices, memory sticks, and the like. Note that the computer-readable medium could even be paper or another suitable medium upon which the program is printed, as the program text can be electronically captured via optical scanning of the paper or other medium, then compiled, interpreted or otherwise processed in a suitable manner if necessary, and then stored in a computer memory.

Figure 8A:
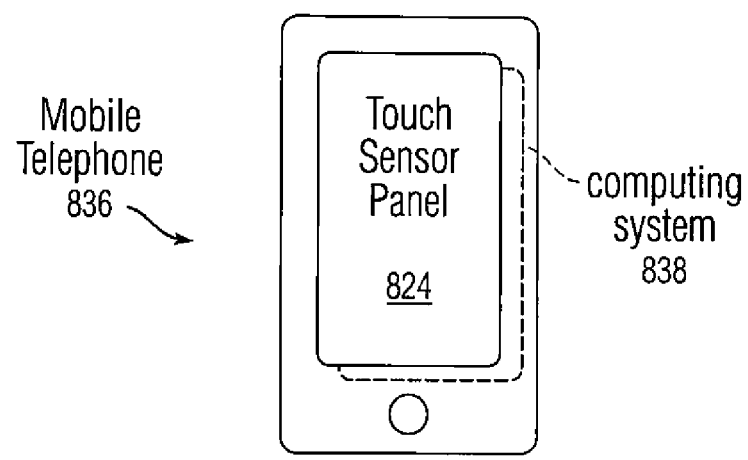
FIG. 8a illustrates an exemplary mobile telephone that can perform negative pixel compensation according to one embodiment of this invention.

FIG. 8*a* illustrates an exemplary mobile telephone 836 that can include touch sensor panel 824 (e.g. touch sensor panel 101 of FIG. 1) and computing system 838 (e.g. computing system 700 of FIG. 7) including firmware stored in memory for performing negative pixel compensation according to embodiments of the invention.

Figure 8B:
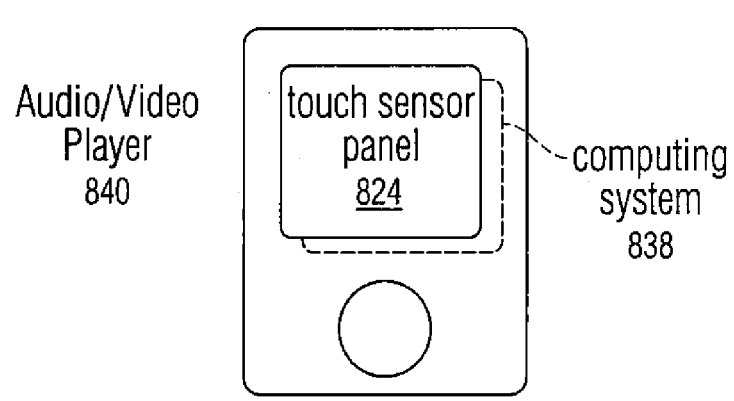
FIG. 8b illustrates an exemplary digital audio player that can perform negative pixel compensation according to one embodiment of this invention.

FIG. 8*b* illustrates an exemplary digital audio/video player 840 that can include touch sensor panel 824 (e.g. touch sensor panel 101 of FIG. 1) and computing system 838 (e.g. computing system 700 of FIG. 7) including firmware stored in memory for performing negative pixel compensation according to embodiments of the invention.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A method of compensating for a negative pixel effect on a touch sensor panel capable of detecting one or more touches, wherein each touch causes a decrease in charge coupling between drive and sense lines, comprising:
computing a predicted negative pixel value for a pixel on the touch sensor panel based on touch output values for other pixels sharing a same drive line or sense line as the pixel, wherein the pixel experiences an increase in charge coupling between drive and sense lines; and
compensating the pixel by adding a scaled first function of the predicted negative pixel value to a touch output value of the pixel.

2. The method of claim 1, further comprising computing the negative pixel value for the pixel by:
summing a second function of the touch output values for pixels in the drive line of the pixel to generate a first sum;
summing the second function of the touch output values for pixels in the sense line of the pixel to generate a second sum; and
multiplying the first sum and the second sum to generate the negative pixel value.

3. The method of claim 2, wherein the second function is linear for low touch output values and reduces to zero for high touch output values.

4. The method of claim 2, further comprising:
summing the second function of the touch output values only for those pixels in the drive line of the pixel having a touch output value above a predetermined threshold; and
summing the second function of the touch output values only for those pixels in the sense line of the pixel having a touch output value above the predetermined threshold.

5. The method of claim 1, further comprising normalizing the negative pixel value by dividing the negative pixel value by a product of a total number of drive lines and a total number of sense lines in the touch sensor panel.

6. The method of claim 1, further comprising compensating the pixel by adding a scaled function of the predicted negative pixel value for that pixel to the touch output value for that pixel only if the touch output value is greater than or equal to a predetermined threshold.

7. The method of claim 1, further comprising compensating for a negative pixel effect caused by two or more simultaneous touch events from a poorly grounded object.

8. The method of claim 1, further comprising compensating pixels only after determining that a poorly grounded user is likely present.

9. The method of claim 8, further comprising determining that a poorly grounded user is likely present by computing a ratio of pixels with positive touch output values to pixels with negative touch output values.

10. The method of claim 1, wherein the first function is linear for low touch output values and flattens for high touch output values.

11. An apparatus for compensating for a negative pixel effect on a touch sensor panel capable of detecting one or more touches wherein each touch causes a decrease in charge coupling between drive and sense lines, the apparatus comprising:
a processor programmed for
computing a predicted negative pixel value for a pixel on a touch sensor panel based on touch output values for other pixels sharing a same drive line or sense line as the pixel, wherein the pixel experiences an increase in charge coupling between drive and sense lines, and compensating the pixel by adding a scaled first function of the predicted negative pixel value to a touch output value of the pixel.

12. The apparatus of claim 11, the processor further programmed for computing the negative pixel value for the pixel by:
   summing a second function of the touch output values for pixels in the drive line of the-pixel to generate a first sum;
   summing the second function of the touch output values for pixels in the sense line of the pixel to generate a second sum; and
   multiplying the first sum and the second sum to generate the negative pixel value.

13. The apparatus of claim 12, wherein the second function is linear for low touch output values and reduces to zero for high touch output values.

14. The apparatus of claim 12, the processor further programmed for:
   summing the second function of the touch output values only for those pixels in the drive line of the pixel having a touch output value above a predetermined threshold; and
   summing the second function of the touch output values only for those pixels in the sense line of the pixel having a touch output value above the predetermined threshold.

15. The apparatus of claim 11, the processor further programmed for normalizing the negative pixel value by dividing the negative pixel value by a product of a total number of drive lines and a total number of sense lines in the touch sensor panel.

16. The apparatus of claim 11, the processor further programmed for compensating a pixel by adding a scaled function of the predicted negative pixel value for that pixel to the touch output value for that pixel only if the touch output value is greater than or equal to a predetermined threshold.

17. The apparatus of claim 11, the processor further programmed for compensating for a negative pixel effect caused by two or more simultaneous touch events from a poorly grounded object.

18. The apparatus of claim 11, the processor further programmed for compensating pixels only after determining that a poorly grounded user is likely present.

19. The apparatus of claim 18, the processor further programmed for determining that a poorly grounded user is likely present by computing a ratio of pixels with positive touch output values to pixels with negative touch output values.

20. The apparatus of claim 11, wherein the first function is linear for low touch output values and flattens for high touch output values.

21. A computing system comprising the apparatus of claim 11.

22. A non-transitory computer-readable medium comprising program code for compensating for a negative pixel effect on a touch sensor panel capable of detecting one or more touches wherein each touch causes a decrease in charge coupling between drive and sense lines, the program code for causing performance of a method comprising:
   computing a predicted negative pixel value for a pixel on the touch sensor panel based on touch output values for other pixels sharing a same drive line or sense line as the pixel, wherein the pixel experiences an increase in charge coupling between drive and sense lines; and
   compensating the pixel by adding a scaled first function of the predicted negative pixel value to a touch output value of the pixel.

23. The non-transitory computer-readable medium of claim 22, the program code further for computing the negative pixel value for the pixel by:
   summing a second function of the touch output values for pixels in the drive line of the pixel to generate a first sum;
   summing the second function of the touch output values for pixels in the sense line of the pixel to generate a second sum; and
   multiplying the first sum and the second sum to generate the negative pixel value.

24. The non-transitory computer-readable medium of claim 22, the program code further for normalizing the negative pixel value by dividing the negative pixel value by a product of a total number of drive lines and a total number of sense lines in the touch sensor panel.

25. The non-transitory computer-readable medium of claim 22, the program code further for compensating the pixel by adding a scaled function of the predicted negative pixel value for that pixel to the touch output value for that pixel only if the touch output value is greater than or equal to a predetermined threshold.

26. A mobile telephone including an apparatus for compensating for a negative pixel effect on a touch sensor panel capable of detecting one or more touches wherein each touch causes a decrease in charge coupling between drive and sense lines, the apparatus comprising:
   a processor programmed for
      computing a predicted negative pixel value for a pixel on a touch sensor panel based on touch output values for other pixels sharing a same drive line or sense line as the pixel, wherein the pixel experiences an increase in charge coupling between drive and sense lines, and
      compensating the pixel by adding a scaled first function of the predicted negative pixel value to a touch output value of the pixel.

27. A digital audio player including an apparatus for compensating for a negative pixel effect on a touch sensor panel capable of detecting one or more touches wherein each touch causes a decrease in charge coupling between drive and sense lines, the apparatus comprising:
   a processor programmed for
      computing a predicted negative pixel value for a pixel on a touch sensor panel based on touch output values for other pixels sharing a same drive line or sense line as the pixel, wherein the pixel experiences an increase in charge coupling between drive and sense lines, and
      compensating the pixel by adding a scaled first function of the predicted negative pixel value to a touch output value of the pixel.

* * * * *